(12) United States Patent
Kamamori

(10) Patent No.: US 10,642,422 B2
(45) Date of Patent: May 5, 2020

(54) INFORMATION PROCESSING APPARATUS, CONTROL METHOD FOR THE INFORMATION PROCESSING APPARATUS, AND STORAGE MEDIUM

(71) Applicant: CANON KABUSHIKI KAISHA, Tokyo (JP)

(72) Inventor: Yuki Kamamori, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 235 days.

(21) Appl. No.: 15/496,942

(22) Filed: Apr. 25, 2017

(65) Prior Publication Data

US 2017/0315674 A1 Nov. 2, 2017

(30) Foreign Application Priority Data

Apr. 28, 2016 (JP) .................................. 2016-091625

(51) Int. Cl.
*G06F 3/042* (2006.01)
*G06F 3/048* (2013.01)
*G06F 3/0488* (2013.01)

(52) U.S. Cl.
CPC ............ *G06F 3/0425* (2013.01); *G06F 3/048* (2013.01); *G06F 3/0426* (2013.01); *G06F 3/0428* (2013.01); *G06F 3/04886* (2013.01); *G06F 2203/04101* (2013.01)

(58) Field of Classification Search
CPC ...... G06F 3/0425; G06F 3/0426; G06F 3/048; G06F 3/04886; G06F 2203/04101

USPC ...................... 178/18.01–19.07; 345/173–178
See application file for complete search history.

(56) References Cited

U.S. PATENT DOCUMENTS

| 2015/0350615 | A1* | 12/2015 | Ono | G06F 3/0418 |
| | | | | 348/140 |
| 2016/0283040 | A1* | 9/2016 | Suzuki | G06F 3/0425 |

FOREIGN PATENT DOCUMENTS

| JP | 4858631 B2 | 1/2012 |
| WO | 2016/035231 A1 | 3/2016 |

* cited by examiner

*Primary Examiner* — Michael Pervan
(74) *Attorney, Agent, or Firm* — Canon U.S.A. Inc., IP Division

(57) ABSTRACT

An information processing apparatus includes an image obtaining unit configured to obtain an image obtained while imaging is performed by pointing an imaging unit towards a target surface, a distance obtaining unit configured to obtain, with regard to a plurality of areas constituting the image, information equivalent to distances from a position corresponding to a reference to surfaces to be imaged in the respective areas, and a recognition unit configured to use the information obtained by the distance obtaining unit with regard to a first area where a predetermined region of an object is imaged in one of the images obtained by the image obtaining unit and the information obtained by the distance obtaining unit with regard to a second area that is a part of the image and in contact with a surrounding of the first area to recognize an input state to the target surface by the object.

17 Claims, 12 Drawing Sheets

INFORMATION PROCESSING APPARATUS, CONTROL METHOD FOR THE INFORMATION PROCESSING APPARATUS, AND STORAGE MEDIUM

BACKGROUND OF THE INVENTION

Field of the Invention

The present disclosure relates to a technology for detecting a touch input by an operator.

Description of the Related Art

In recent years, there has been a circumstance in which a user interface (hereinafter, will be referred to as a UI) is projected onto an arbitrary surface such as a wall or a desk, and a touch is performed on the projected UI. In addition, there has been a circumstance in which a touch is performed on a physically existing object, and information related to the object is displayed on a head mount display (HMD) on the basis of the touch in an environment such as an augmented reality (AR) or a mixed reality (MR).

In the above-described circumstances, it is determined in many times whether or not a target surface and a part of a predetermined object (for example, a fingertip of an operator) are in contact with each other on the basis of a distance between the target surface and the part of the predetermined object by using an imaging unit for a range image which can obtain distance information such as a stereo camera or an infrared camera. Specifically, a predetermined threshold is set with respect to the distance between the target surface and the fingertip of the operator, and it is determined that the fingertip touches the target surface in a case where the target surface and the fingertip come close to each other to such an extent that the distance becomes lower than the threshold. Hereinafter, a contact made from a state in which the fingertip and the target surface are not in contact with each other will be referred to as a touch, and a non-contact state made from the contact state will be referred to as a release.

In the touch detection based on the range image, the target surface may be shielded by the predetermined object, which may become a dead corner for a unit configured to obtain the distance information such as the imaging unit for the range image. Therefore, even in a case where the target surface is shielded by the predetermined object, it is necessary to estimate a distance from the imaging unit to the target surface.

According to Japanese Patent NO. 4858631, a predetermined image is projected onto the target surface, and an image capturing the target surface on which the predetermined image is projected is analyzed, so that the distance from the imaging unit to the target surface is measured in advance.

In a case where the object including the target surface moves, a case where the imaging unit mounted to the HMD moves, or the like, the distance from the imaging unit to the target surface may vary in some cases. It is sufficient when a distance relationship between the target surface and the imaging unit after the distance variation can be measured again, but in a case where the distance variation occurs in a state in which the target surface is shielded by the predetermined object, it is difficult to measure the distance between the imaging unit and the shielded area again. No considerations have been made with respect to the above-described case in Japanese Patent No. 4858631, and the touch operation with respect to the target surface that varies in the shielded state is not detected.

SUMMARY OF THE INVENTION

An information processing apparatus includes an image obtaining unit configured to obtain an image obtained while imaging is performed by pointing an imaging unit towards a target surface, a distance obtaining unit configured to obtain, with regard to a plurality of areas constituting the image, information equivalent to distances from a position corresponding to a reference to surfaces to be imaged in the respective areas, and a recognition unit configured to use the information obtained by the distance obtaining unit with regard to a first area where a predetermined region of an object is imaged in one of the images obtained by the image obtaining unit and the information obtained by the distance obtaining unit with regard to a second area that is a part of the image and in contact with a surrounding of the first area to recognize an input state to the target surface by the object.

Further features of the present disclosure will become apparent from the following description of exemplary embodiments with reference to the attached drawings.

DESCRIPTION OF THE EMBODIMENTS

Figure 1:
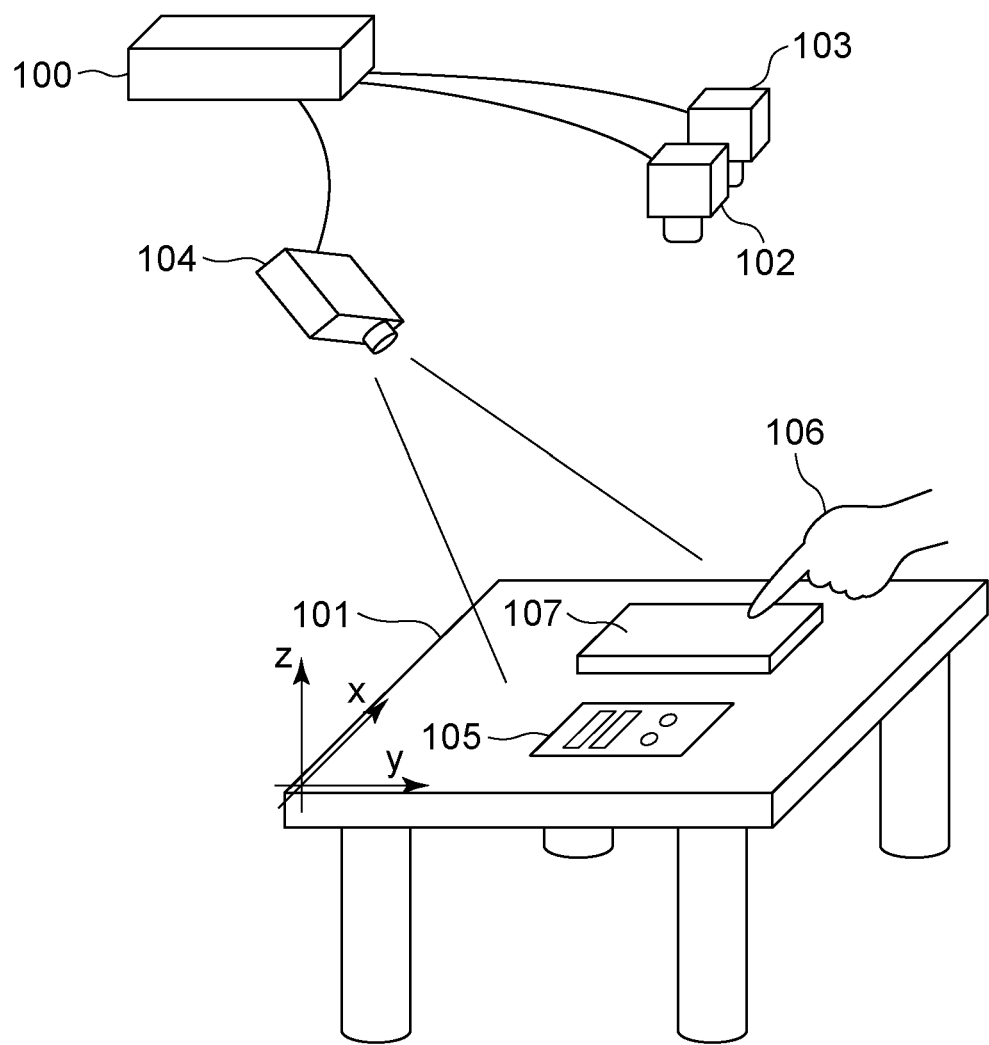
FIG. 1 illustrates an example of an external view of a system using an information processing apparatus according to a first exemplary embodiment.

Hereinafter, information processing according to an exemplary embodiment will be described in detail with reference to the drawings. It should be noted that configurations described according to the exemplary embodiment are examples and are not intended to limit the scope of the present invention to those configurations.

According to the exemplary embodiment which will be described below, a recognition accuracy for an input is to be improved in a system where a state in which a distance between a predetermined object and a target surface becomes lower than a predetermined distance is recognized as the input to the target surface by the predetermined object.

In general, "touch" refers to an operation in which the fingertip contacts or comes close to a surface of the object or a display area of an item projected to the surface, and a touch input with respect to the object and the item is started. "Release" refers to an operation in which the contacted or approximated fingertip is released from the object and the item after the touch operation to end the touch input with respect to the object and the item. A large number of information processing apparatuses adopting the touch can recognize various touch operations such as "tap," "move," and "flick" on the basis of a position, a movement, and a speed of the fingertip during a period from the touch to the release. For example, a series of inputs in which the fingertip touches the target surface, and thereafter the release is immediately performed without substantially moving in a direction along the target surface is referred to as the "tap." The tap is recognized as an instruction for selecting the touched object in many cases. An input in which the fingertip touches the target surface, and thereafter the fingertip is moved in the direction along the target surface while the touch state is maintained is referred to as the "move." The move is recognized as an instruction for moving the touched object, specifying a range, and drawing a line in many cases. According to the present exemplary embodiment, an information processing apparatus will be described as an example in which the "touch" and the "release" are respectively recognized as independent operation inputs of "touch operation" and "release operation," and feedback is performed with respect to the operator each time the operation is recognized. For example, a pointer is projected and displayed on a position where the target surface is touched (hereinafter, will be referred to as a touch position) in accordance with the recognition of the touch operation. Furthermore, in a case where the release operation is recognized, the projection display of the pointer is ended. In addition, according to the present exemplary embodiment, a general operation input on the basis of the contact state during the period from the touch to the release will be referred to as a touch input.

In portable devices such as a smart phone and a tablet personal computer (PC), a touch sensor provided to a display screen can directly detect that the fingertip of the operator contacts the display screen and recognize the touch and the release in many cases. In contrast to this, in a case where the touch and the release with respect to a surface of an arbitrary object are detected without the provision of the touch sensor, a distance between the fingertip and the target surface is measured by using an imaging unit for the range image or the like. This operation is equivalent to an operation in which a position of an element in the imaging unit or the like is set as a reference, and a difference between a distance from the reference to the fingertip and a distance from the reference to the target surface is measured. In a case where the target surface for the touch is an arbitrary object or the like, there is a possibility that the target surface itself varies, and the distance from the reference to the target surface changes. In addition, in a case where the imaging unit is movable, there is a possibility that the distance from the reference to the target surface changes when the imaging unit moves. For this reason, the distance from the reference to the touch target surface is preferably periodically measured. However, when the target surface is shielded by the hand including the fingertip or the arm and becomes the dead corner for the imaging unit, the distance to the target surface is not measured in some cases. If the target surface or the imaging unit moves in the shielded state and the distance from the imaging unit to the target surface changes, it is difficult to measure a distance to a part shielded by any object in the target surface (hereinafter, will be referred to as a shielded area) again. At this time, the touch and/or the release by the fingertip with respect to the shielded area of the target surface is not accurately detected. In addition, although there is a possibility that the distance from the imaging unit to the target surface is not changed from the previously measured distance at this time, unless the fact is confirmed, a reliability of a detection result using the previously measured distance is decreased.

In view of the above, according to the present exemplary embodiment, the touch and/or the release of the fingertip with respect to the shielded target surface is detected on the basis of the comparison between the distance of the target surface and the distance of the fingertip in the vicinity of the shielded area that is shielded by the fingertip. Specifically, a window area is provided in the vicinity of the fingertip in the range image, a distance from the reference to the target surface included in the shielded area is estimated on the basis of respective pixel values within the window to be compared with the distance from the same reference to the fingertip. When the target surface is flat in the shielded area, it is possible to estimate that the distance from the reference to the target surface located in the vicinity of the shielded area is close to the distance from the reference to the part shielded by the fingertip in the target surface. Furthermore, according to the present exemplary embodiment, when the pixel values within the window are spatially discontinuous, a part where the pixel values within the window are discontinuous is divided into small areas. Then, the distance from the reference to the target surface is determined for each of the small areas to be compared with the distance from the same reference to the fingertip. In addition, the touch position is determined on the basis of the contact point between the fingertip and the small area where it is determined that the distance with respect to the fingertip is close in the image. Even in a case where the target surface is not flat in the shielded area, while the area is divided into the small areas to be locally observed as described above, an estimation is established that the distance from the reference to the target surface located in the vicinity of the shielded area is close to the distance from the reference to the part shielded by the fingertip in the target surface.

Hereinafter, according to a first exemplary embodiment, an operation will be described as an example in which the operator places the object on the target surface in a table top interface system and specifies an arbitrary area on the surface of the object by way of the touch input using one finger of one hand, and the area is imaged by the system. It is assumed that the touch input to be used is a series of inputs from the touch to the move and then to the release. Herein, the predetermined object is the hand of the operator, and a predetermined region of the predetermined object used for indicating a touch position (hereinafter, will be referred to as an indicating region) is a fingertip part corresponding to an end part of the hand. The target surface for the touch input is equivalent to a table and the surface of the object. It should be noted that, in the following explanation, the hand of the operator is exemplified as the predetermined object used for the operation input by the operator, but the present exemplary embodiment can also be applied to a case where an object such as a stylus or a robot arm is used as the predetermined object.

External View of the System

FIG. 1 illustrates an example of an external view of the table top interface system in which an information processing apparatus 100 according to the present exemplary embodiment is installed. FIG. 1 also illustrates coordinate axes for defining position information in a three-dimensional space. The target surface 101 is a table part of the table top interface. The operator can input the touch operation by touching the target surface 101. According to the present exemplary embodiment, a visible light camera 102 and a range image sensor 103 are installed above the table so as to look down at the target surface 101. Therefore, a depth direction intersects with the target surface 101 in each of captured images. That is, the depth direction of the captured image is associated with a distance (height) from the target surface 101, and this information is used for detecting the touch input. A visual light image obtained by the visible light camera 102 is input to the information processing apparatus 100 as an input image. The information processing apparatus 100 analyzes the input image and extracts a skin color area in the image, so that a hand 106 of the operator existing in a space above the target surface 101 is detected. In addition, according to the present exemplary embodiment, the information processing apparatus 100 can function as a document camera configured to control the visible light camera 102 to image an object 107 placed on the target surface 101 and obtain the read image.

According to the present exemplary embodiment, the range image sensor 103 is also installed so as to look down at the target surface 101. The range image is an image in which a depth from a position corresponding to a reference (for example, a lens center of the imaging unit used for the imaging or the like) to a surface to be imaged on the pixel (information corresponding to the distance along the depth direction of the image) is reflected on a value of each pixel. The range image may also be referred to as a depth image in some cases. According to the present exemplary embodiment, a distance to the hand 106 of the operator or the surface of the object 107 existing on the target surface 101 or above the target surface 101 while the range image sensor 103 is set as the reference is reflected on a pixel value of the range image captured by the range image sensor 103. The information processing apparatus 100 analyzes the visual light image and the range image to obtain a three-dimensional position of the hand 106 of the operator and recognizes an input operation. Therefore, the operator can input a spatial gesture operation by moving the predetermined object such as the hand within a range where the imaging can be performed by the visible light camera 102 and the range image sensor 103 in the space above the target surface 101. According to the present exemplary embodiment, a sensor of a pattern irradiation method using infrared light or a time-of-flight (TOF) method is used.

In the case of the system illustrated in FIG. 1, the visible light camera 102 and the range image sensor 103 are fixed. On the other hand, the object 107 is placed in an arbitrary position on the target surface 101. The object 107 can be removed or moved, and also it is possible to increase or decrease the number of objects. In addition, a shape of the object itself is arbitrary. For this reason, the target surface has irregularities depending on the presence or absence of the object or a shape of the object. As a result, the distance from the range image sensor 103 to the target surface may vary at a plurality of locations through which the position indicated by the operator with the fingertip during the move operation passes in some cases. In this manner, in the system illustrated in FIG. 1, the distance from the visible light camera 102 and the range image sensor 103 to the surface of the object 107 may vary.

A projector 104 projects an image onto the target surface 101 or an upper surface of the object 107. In the present system, the operator performs the operation based on the touch or the spatial gesture with respect to an item 105 included in the projected image. In addition, the projector 104 projects an image such as a pointer onto the touch position as a visual feedback with respect to the touch operation. It should be noted that, as descried above, according to the present exemplary embodiment, the visual light image obtained by using the visible light camera 102 is used for the detection of the hand 106 and the recognition of the operation, and therefore projection video is preferably restricted to a color tone that takes the skin color area extraction into account. It should be noted however that the range image obtained by using the range image sensor 103 can be used for the detection and the recognition instead of the visual light image. In this case, an advantage is attained that the configuration is not affected even when a color of the hand of the operator is changed because of an influence of the projection light of the projector 104. In addition, a projection cycle of the projector 104 and an imaging cycle of the visible light camera 102 can be synchronized with each other, and the projection and the imaging can be switched at a high speed at such a level that the operator does not visually recognize the switching, so that it is also possible to detect the hand by the skin color area extraction without being affected from the influence of the projection light. In addition, the target surface 101 can be constituted by a liquid crystal display as a display apparatus of the present system instead of the projector 104. In this case, by using the method of detecting the human hand from the image by way of the detection of the skin color area from the visual light image or the like, the hand can be detected without being affected from the influence of the projection light.

It should be noted that the range image sensor 103 and the visible light camera 102 themselves do not necessarily need to be located above the target surface 101 as long as the configuration is adopted in which the image of the target surface 101 viewed from above can be obtained. For example, an image of the target surface 101 at a field angle viewed from above can be obtained when the range image sensor 103 and the visible light camera 102 are installed so as to image a mirror arranged above the target surface. Similarly, the projector 104 also performs the projection onto the target surface 101 so as to look down from obliquely above in the example of FIG. 1, but the projection light projected towards a different direction may be reflected on the target surface 101 by using a mirror or the like. In addition, the present exemplary embodiment can be applied to a system in which a plane that is not horizontal such as a white board or a wall surface is set as the target surface 101.

Configuration of the Apparatus

Figure 2A:
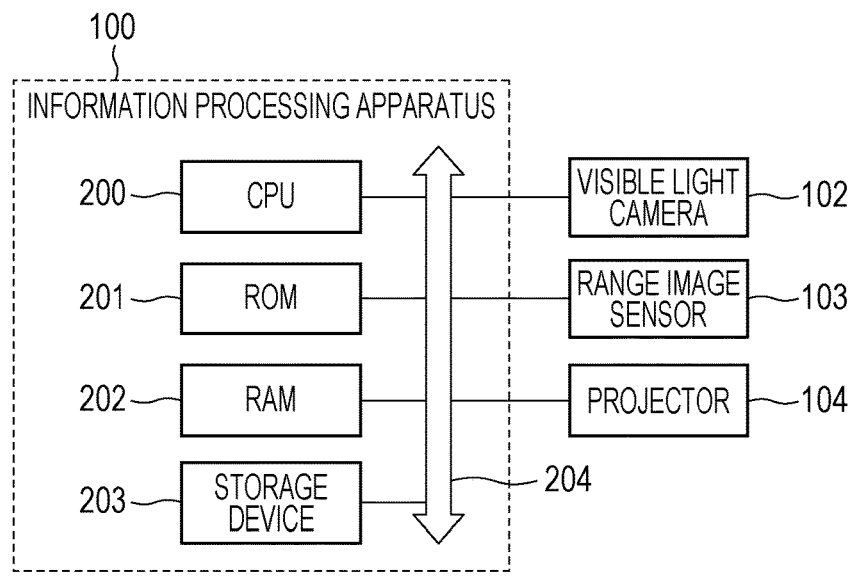
FIG. 2A is a block diagram illustrating a hardware configuration of the information processing apparatus according to the first exemplary embodiment.

FIG. 2A is a hardware configuration diagram of the table top interface including the information processing apparatus 100 according to the present exemplary embodiment. A central processing unit (CPU) 200 uses a RAM 202 as a work memory and executes an operating system (OS) or a program stored in a ROM 201 or a storage device 203 to perform calculation and logical determination of various processings or the like, so that respective configurations connected to a system bus 204 are controlled. The processing executed by the CPU 200 includes recognition processing for the touch operation which will be described below. The storage device 203 is a hard disc drive or an external storage device connected by or various interfaces or the like. The storage device 203 stores a program and various pieces of data related to the operation recognition processing according to the exemplary embodiment. The visible light camera 102 captures the visual light image of the space including the table, the hand of the operator on the table, and the object in accordance with the control of the CPU 200 and outputs the imaged visual light image to the system bus 204. The range image sensor 103 captures the range image of the space including the table, the hand of the operator on the table, and the object in accordance with the control of the CPU 200 and outputs the imaged range image to the system bus 204. According to the present exemplary embodiment, an obtaining method for the range image will be described on the basis of a method of using environment light or infrared light that has little influence on the display of the target surface 101, but it is also possible to use a parallax method in accordance with a use. The projector 104 projects and displays an image item corresponding to an operation target or a feedback image with respect to the touch operation onto the table and the object surface in accordance with the control of the CPU 200.

It should be noted that the visible light camera 102, the range image sensor 103, and the projector 104 are respectively external apparatuses connected to the information processing apparatus 100 via input and output interfaces and constitute an information processing system in collaboration with the information processing apparatus 100 in the use example of FIG. 1. It should be noted however that these devices may also be integrated into the information processing apparatus 100.

Figure 2B:
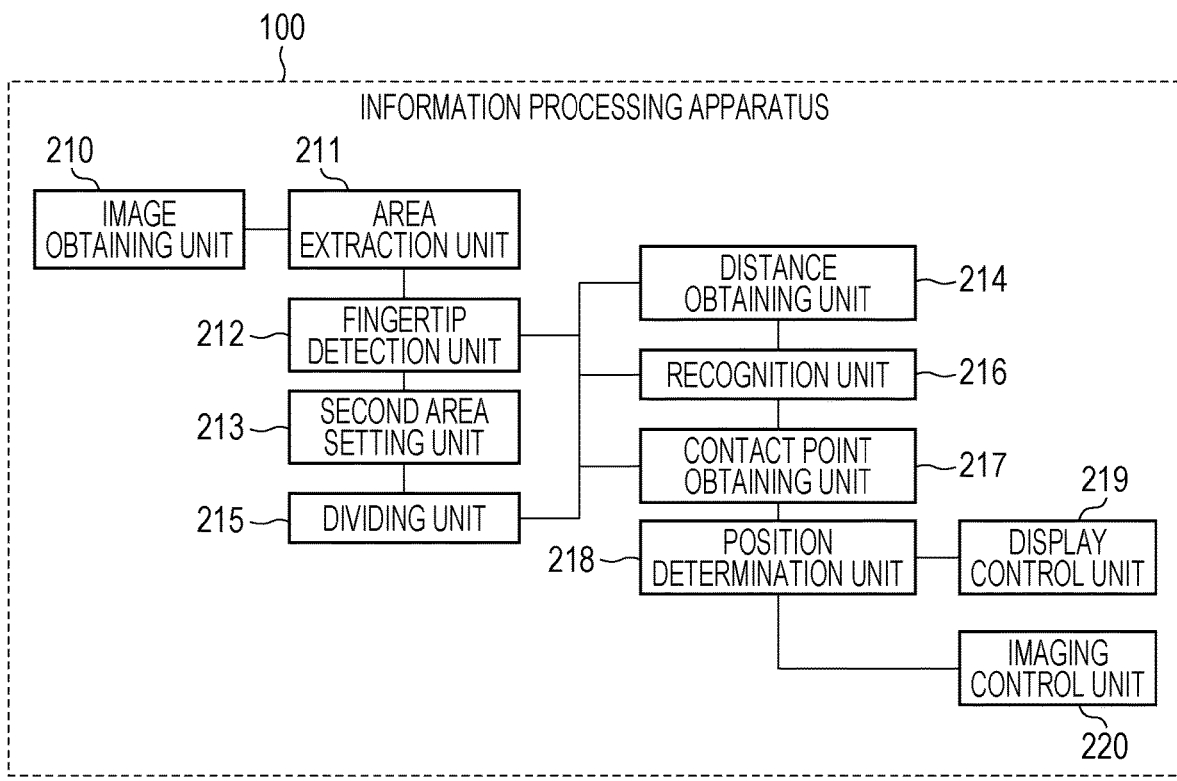
FIG. 2B is a block diagram illustrating an example of a function configuration according to the first exemplary embodiment.

FIG. 2B is a block diagram illustrating an example of a function configuration of the information processing apparatus 100 according to the present exemplary embodiment. The respective function units are realized while the CPU 200 expands the program stored in the ROM 201 into the RAM 202 and executes processings in accordance with respective flow charts which will be described below. For example, in a case where hardware is constituted as an alternative for the software processing using the CPU 200, it is sufficient when a calculation unit and a circuit corresponding to the processings of the respective function units described herein are constituted.

An image obtaining unit 210 obtains the visual light image imaged by the visible light camera 102 as the input image at predetermined time intervals to be continually held in the RAM 202. The obtained visual light image is equivalent to a frame image of real time video. It should be noted that the target obtained by the image obtaining unit 210 and exchanged by the respective function units is a signal corresponding to image data in actuality, but the state will be simply represented as "obtaining the visual light image" or "obtaining the input image" in the present specification.

An area extraction unit 211 applies threshold determination or noise reduction processing to the respective pixels of the input image obtained by the image obtaining unit 210 in accordance with the skin color extraction to extract a hand area in the input image. The hand area refers to an area where a hand used as the predetermined object by the operator is captured in the input visual light image.

A fingertip detection unit 212 detects a first area equivalent to the fingertip in the hand area of the operator as the indicating region on the basis of outline information of the hand area extracted by the area extraction unit 211. It should be noted however that the detection method for the first area is not limited to this. For example, the calculation can also be simplified while the detection is simply performed on the basis of a position of the pixel in the hand area where a distance from an intrusion position of the hand area in the visual light image (position where an edge of the image intersects with the hand area) becomes the longest, for example.

A second area setting unit 213 sets an area having a predetermined size which is located in the vicinity of the first area detected by the fingertip detection unit 212 as a second area. According to the present exemplary embodiment, an area except for the hand area in an area constituted by the pixels having a certain distance or shorter from a contour of a part detected as the fingertip is set as the second area. It should be noted however that the setting method for the second area is not limited to this, and the calculation can also be simplified by setting the second area as a rectangular or circular area in the vicinity of the first area.

A distance obtaining unit 214 obtains the range image captured by the range image sensor 103 at predetermined time intervals to be continually held in the RAM 202. The obtained range image is also equivalent to a frame image of video captured in real time. Furthermore, the distance obtaining unit 214 uses a transformation matrix based on sensor parameters and a position relationship of the visible light camera 102 and the range image sensor 103 to perform mapping of depths (distances to the surface to be imaged) reflected on the respective pixels of the range image as distance information associated with the respective pixels of the visual light image. As a result, according to the present exemplary embodiment, a state is obtained in which the distance from the reference to the surface to be imaged in the pixel is reflected on each of the pixels of the visual light image. To obtain the distances from the reference to the imaging surfaces of the respective areas with regard to the first area and the second area corresponding to parts of the visual light image, the distance obtaining unit 214 uses the depths mapped onto the pixel groups corresponding to the respective areas of the visual light image among the depths obtained from the range image. According to the present exemplary embodiment, both the visible light camera 102 and the range image sensor 103 are installed at positions substantially perpendicularly looking down at the target surface 101. Therefore, the depth reflecting on the pixel of the range image is substantially the distance along a height direction from the target surface 101.

In addition, according to the present exemplary embodiment, it is assumed that both the visible light camera 102 and the range image sensor 103 are installed so as to be adjacent to each other such that the entirety of the target surface 101 is within the field angle and also optical axes are substantially matched with each other. For this reason, it is assumed that a part corresponding to a dead corner created by the hand or finger of the operator extended onto the object 107 on the target surface 101 is matched in the visible light camera 102 and the range image sensor 103. Therefore, the part shielded by the fingertip in the visual light image is also similarly shielded in the range image, and the depth is not obtained. In the processing of mapping the distances calculated by transforming the depths obtained from the range image onto the respective pixels of the visual light image, the value mapped onto the hand area part is a value indicating the distance from the reference to the surface of the hand, and repetition does not occur with respect to the distance to the target surface 101 corresponding to the part below the hand. That is, the distance calculated by transforming the depth reflecting on the part equivalent to the first area in the range image (fingertip part in the hand area where the hand of the operator is captured) is mapped onto the first area in the visual light image. The distance calculated by transforming the depth reflecting on the part equivalent to the second area in the range image (part located in the vicinity of the fingertip) is mapped onto the second area in the visual light image.

It should be noted that, when the visible light camera 102 and the range image sensor 103 are provided as a single sensor of a lens sharing type, an advantage is attained that the above-described mapping processing can be omitted.

In addition, while a world coordinate system and a transformation matrix based on the sensor parameter and the installation state of the range image sensor 103 are used, it is possible to map an arbitrary pixel in the image onto the world coordinate system. For example, in a case where at least the optical axis of the range image sensor 103 is installed to have an incident angle θ with respect to the target surface 101, a distance represented by a pixel value of the captured range image becomes a size of 1/cos θ with respect to a height (vertical distance) from the target surface 101, and a deviation occurs. This is because the depth reflecting on the pixel of the range image captured by the range image sensor 103 is the distance along the depth direction of the image. As the angle is close to the right angle, the deviation between the part shielded by the finger where it becomes difficult to perform the distance measurement in the range image and the part equivalent to the part immediately below the finger in actuality on the target surface 101 becomes larger. In addition, since the target surface 101 has an angle with respect to the range image sensor 103, the size of the distance mapped in the second area has a width, and a difference from the distance obtained from the first area may become large in some cases. In the above-described environment, while the three-dimensional position information obtained from the range image is transformed into the world coordinate system to be accordingly dealt with, it is possible to perform the recognition of the touch input while the distance between the fingertip and the target surface 101 (height of the finger from the target surface 101) is set as the target. As a result, it may be facilitated to attain a result in conformity to sense visually felt by the operator in some cases.

A dividing unit 215 divides the second area set by the second area setting unit 213 into a plurality of small areas on the basis of a predetermined condition. According to the present exemplary embodiment, a part where the distances mapped onto the respective pixels in the second area are discontinuous is detected on the basis of the distance obtained by the distance obtaining unit 214. Furthermore, in a case where the discontinuous part is detected, the second area is divided into a plurality of small areas in the discontinuous part. As a result, in a contact recognition for the fingertip which will be described below, even in a case where the distances to the target surface are not uniform such as a case where the end part of the object is included in the second area or the like, it is possible to individually recognize the areas having the respective distances.

A recognition unit 216 recognizes the touch input on the target surface by the fingertip by using the fingertip detected by the fingertip detection unit 212 and small areas in the vicinity of the fingertip divided by the dividing unit 215. According to the present exemplary embodiment, the distance from the reference to the fingertip and the distances to the target surfaces imaged in the respective small areas are obtained on the basis of the distance obtained by the distance obtaining unit 214, and those distances are compared with each other for each of the small areas. When it is determined that a distance difference between one or more small areas and the fingertip is lower than the predetermined distance, it is recognized that the fingertip is in contact. That is, it is recognized that the touch input has been performed.

A contact point obtaining unit 217 obtains a set of contact points between the first area in the visual light image and the small area where the recognition unit 216 determines that the distance difference with respect to the fingertip is low (pixels equivalent to a border of both the areas). A position determination unit 218 determines a touch position regarded as a position indicated by the fingertip by way of the touch input on the basis of the first area and the set of the contact points obtained by the contact point obtaining unit 217. The touch position is represented by coordinate values in a coordinate plane defined on the target surface 101. According to the present exemplary embodiment, a circumscribed convex area including the contact points is cut out from the first area, and a center of gravity thereof is set as the touch position in the image. Furthermore, the touch position in the world coordinate system is calculated by mapping the touch position in the image by the transformation matrix together with the distance of the small area or the first area. A detail of this processing will be described below.

A display control unit 219 uses the information stored in the ROM 201 or the storage device 203 and generates and outputs an image projected by the projector 104 onto the target surface 101 and the object 107. According to the present exemplary embodiment, in a case where the touch operation is performed, a pointer is displayed at the position. In addition, a rectangle having the touch operation position and the move operation position as diagonal vertexes is displayed during the move operation and deleted by the release operation. An imaging control unit 220 images a rectangular area specified by the above-described operation from the touch to the move and then to the release by using the visible light camera 102 to be saved in the storage device 203 as an image file.

Recognition Processing of an Area Specification Operation

Figure 3:
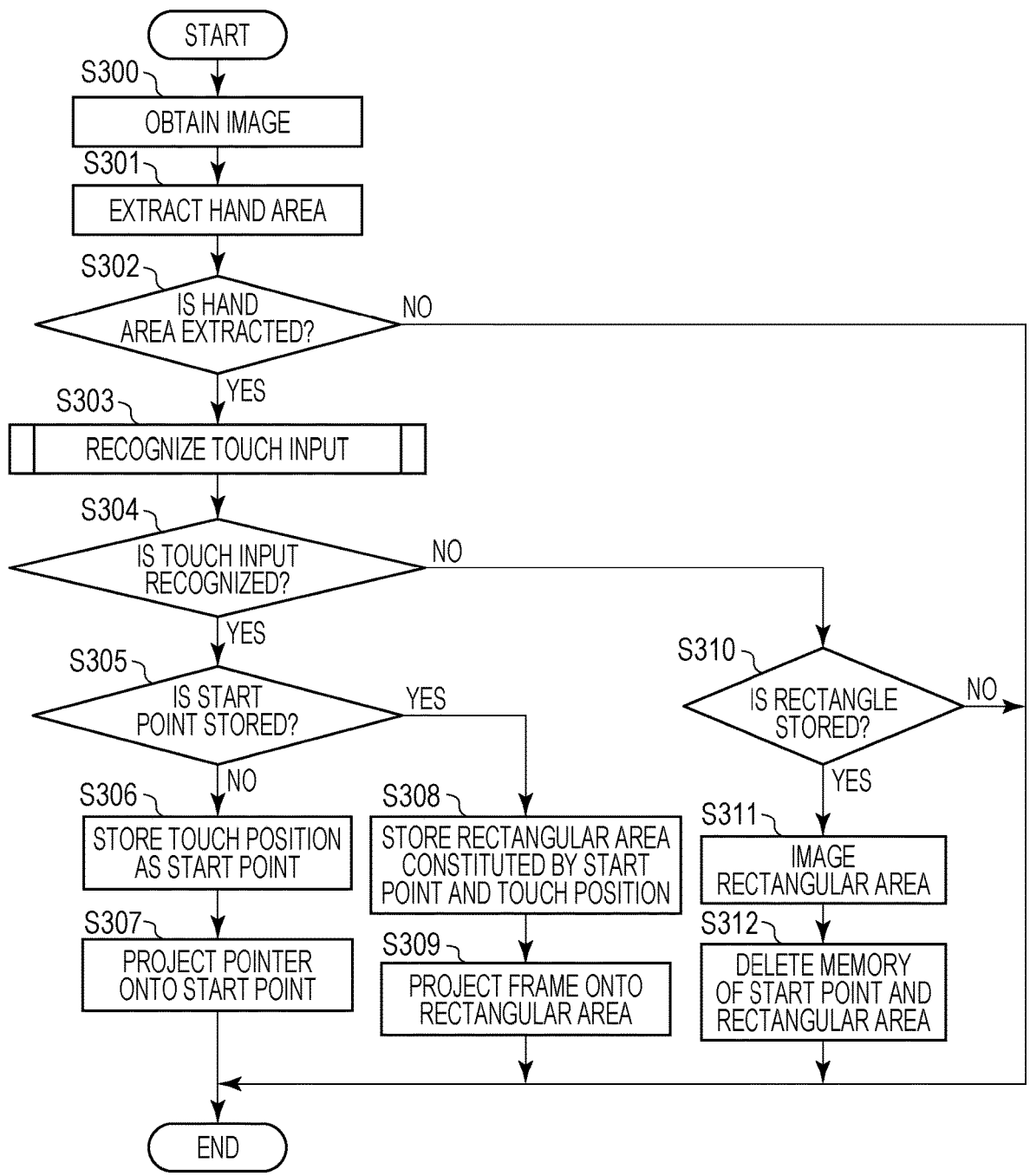
FIG. 3 is a flow chart illustrating an example of a flow of recognition processing of an area specification operation according to the first exemplary embodiment.

A flow of the recognition processing of the touch input executed according to the first exemplary embodiment in accordance with a flow chart of FIG. 3. An operation of application will be described as an example in which the operation for the operator to specify the rectangular area by the touch input is recognized, and an image in which the inside of the specified area is captured by the visible light camera 102 is obtained. Hereinafter, the processing in the flow chart of FIG. 3 may be referred to as "recognition processing of an area specification operation" in some cases. The processing in the flow chart of FIG. 3 is realized while the CPU 200 constituting the respective function units of the information processing apparatus 100 expands the program stored in the ROM 201 into the RAM 202 to be executed.

According to the present exemplary embodiment, the processing of the processing in the flow chart of FIG. 3 is started in accordance with the input of the visual light image captured by the visible light camera 102 to the information processing apparatus 100. In addition, according to the present exemplary embodiment, the processing of the processing in the flow chart of FIG. 3 is repeatedly performed each time the visual light image is input from the visible light camera 102. Therefore, a cycle in which the processing is repeatedly performed is matched with a frame rate of the captured video of the visible light camera 102.

Figure 4:
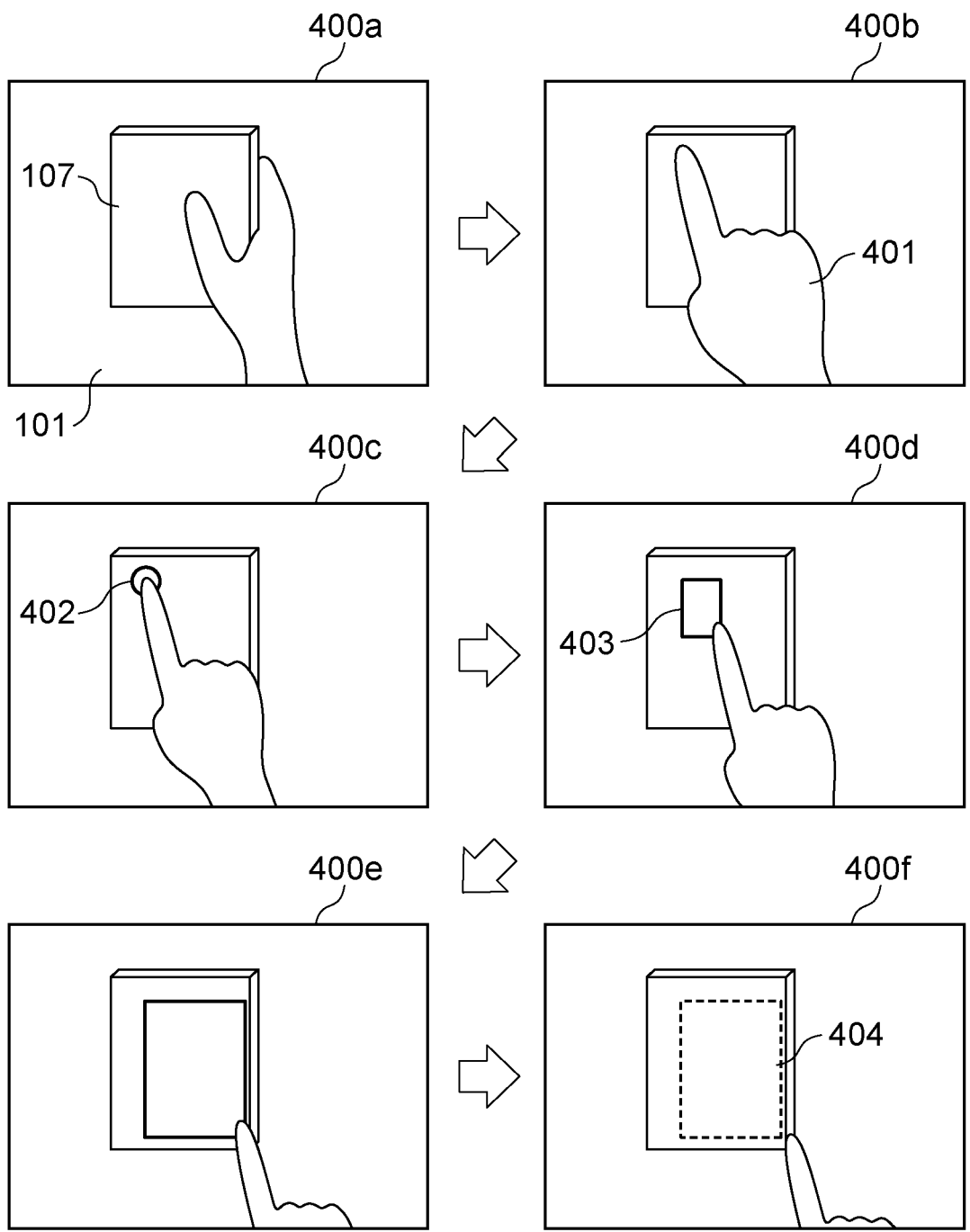
FIG. 4 illustrates an example of a visual light image obtained in the recognition processing of the area specification operation according to the first exemplary embodiment.

In step S300, the image obtaining unit 210 obtains the visual light image in which the table onto which the image is projected and the space including the hand of the operator are captured as the input image from the visible light camera 102. In addition, the distance obtaining unit 214 obtains the range image in which the table and the space including the hand of the operator are captured from the range image sensor 103 and maps the distances onto the respective pixels of the visual light image. Images 400a to 400f of FIG. 4 illustrate a series of visual light images obtained in time series in the recognition processing of the area specification operation. First, the image 400a corresponds to the visual light image captured during the operation by the operator to place the object 107 on the target surface 101. At this time, a part of the object 107 on an observer's lower right side is shielded by the hand of the operator and is not seen from the positions of the visible light camera 102 and the range image sensor 103.

In step S301, the area extraction unit 211 extracts the hand area corresponding to the part where the hand of the operator is reflected from the visual light image. The image 400b corresponds to the visual light image captured immediately before the operator performs the touch operation with respect to the object by the index finger of the right hand. A hand area 401 is extracted from the image 400b. According to the present exemplary embodiment, the respective pixels of the visual light image are scanned to determine whether or not the color is a skin color on the basis of color information. Specifically, color information obtained in an RGB color space for the respective pixels is converted into an HSV color space, and the threshold determination processing is performed with respect to each of hue, saturation, and luminosity. Furthermore, expansion contraction processing is applied to the pixel (area) determined to have the skin color, and the hand area is corrected by removing minute noise derived from color unevenness. It should be noted that the method for the hand area extraction is not limited to this. For example, a shape of the area cut out by the edge in the range image can also be discriminated and extracted as the hand area. In this case, the accuracy decrease in the skin color determination caused when the visual light image is reflected into the projection video can be suppressed.

In step S302, the area extraction unit 211 determines whether or not the hand area is extracted, and in a case where the hand area is not extracted (step S302: NO), the processing with respect to the input image is ended. In a case where the hand area is extracted (step S302: YES), the flow proceeds to step S303. In step S303, the fingertip detection unit 212 and the recognition unit 216 detects the fingertip from the hand area extracted from step S302 and recognizes the touch input to determine the touch position. It should be noted that whether or not the fingertip contacts the table or the surface of the object is output in this recognition processing, and in a case where the fingertip contacts the table or the surface of the object, the position contacted by the fingertip is further output as the touch position. Detailed explanations with regard to the processing contents of the recognition of the touch input and the position detection will be described below. In step S304, the display control unit 219 determines whether or not the touch input is recognized in step S303. In a case where the touch input is recognized (step S304: YES), the flow proceeds to step S305. In a case where the touch input is not recognized (step S304: NO), the flow proceeds to step S310.

In step S305, the display control unit 219 determines whether or not the RAM 202 stores a start point of the touch input. The start point is equivalent to the touch position when the touch input by the operator is started. In a case where the start point is not stored (step S305: NO), the flow proceeds to step S306, and the display control unit 219 newly stores the touch position detected in step S303 as the start point in the RAM 202. Furthermore, the flow proceeds to step S307, and the display control unit 219 controls the projector 104 to project a pointer image that can be visually recognized by the operator onto a position of the start point. In FIG. 4, a state is captured in the image 400c in which a pointer image 402 is displayed at the start position of the touch input. On the other hand, in a case where the start point is stored (step S305: YES), the flow proceeds to step S308, and the display control unit 219 newly stores a rectangular area having the start point stored in the RAM 202 and the touch position detected in step S303 as diagonal vertexes in the RAM 202. The rectangular area is equivalent to an imaging target area that is being specified or has been specified by the operator. Furthermore, the flow proceeds to step S309, and the display control unit 219 controls the projector 104 to project an image of a rectangular frame that can be visually recognized by the operator onto the position of the rectangular area. In FIG. 4, the image 400d and the image 400e illustrates a state in which an image 403 representing the rectangular frame is displayed. From a time when the image 400d is captured until the image 400e is captured, the size of the rectangular area is changed since the fingertip of the operator is moved. In the image 400e, the finger of the operator touches the end part of the object 107. Herein, the touched part is regularly in the shielded state by the hand of the operator after the object 107 is placed on the target surface 101, and the touched part does not appear in any of the images 400a to 400d. That is, distance information of the target surface that should exist below the finger is not obtained, or a height of the position in an initial state before the object 107 is placed is obtained as initial information. It is difficult to perform the distance measurement using the range image sensor 103 of the present system in the shielded part on the surface of the object 107. Furthermore, when the image 400e is captured, since the finger of the operator touches the end part of the object 107, the shape is different from the target surface existing below the finger in the situations illustrated in the images 400a to 400d. According to the present exemplary embodiment, the recognition of the touch input can be performed even when the target surface varies such as a case where the object is placed while the touch target surface is shielded by the finger as described above by touch input recognition processing which will be described below or the like.

In step S310, the imaging control unit 220 determines whether or not the RAM 202 stores the rectangular area specified by the touch input. In a case where the rectangular area is not stored (step S310: NO), the processing with respect to the input image is ended. In a case where the rectangular area is stored (step S310: YES), the flow proceeds to step S311, and the imaging control unit 220 controls the visible light camera 102 to capture the visual light image and stores the part equivalent to the rectangular area as the image file in the storage device 203. Furthermore, the flow proceeds to step S312, and the display control unit 219 deletes information of the start point stored in the RAM 202 and the rectangular area. In FIG. 4, the image 400f represents the visual light image imaged after the end of the touch input. It should be noted that the hand or the finger of the operator remains in the rectangular area in some cases after the end of the touch input in the imaging processing in step S311, and when the imaging is performed after the end of the touch input, the hand or the finger may be reflected into the image. In view of the above, the reflection can also be avoided by adding such control that a standby period is allowed to elapse for several seconds until the imaging processing is started after the end of the touch input, or the imaging is performed after it is detected that the hand area exits from the rectangular area, for example.

Touch Input Recognition Processing

Figure 5:
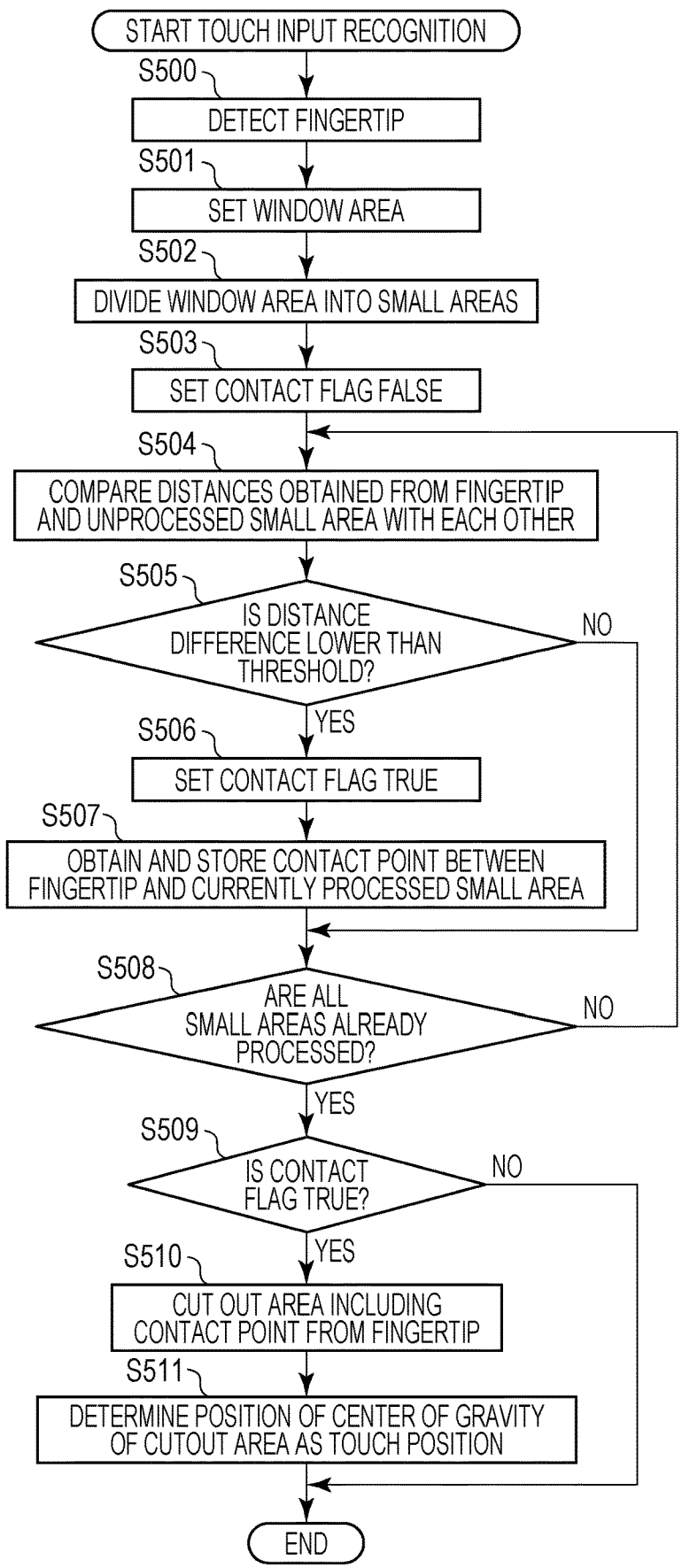
FIG. 5 is a flow chart illustrating an example of a flow of touch recognition processing according to the first exemplary embodiment.

Here, the recognition processing of the touch input in step S303 will be described. FIG. 5 is a flow chart illustrating the recognition processing of the touch input the first exemplary embodiment. The processing in the flow chart of FIG. 5 is started in accordance with the extraction of the hand area from the visual light image in step S302.

First, in step S500, the fingertip detection unit 212 detects the area equivalent to the fingertip from the hand area extracted in the visual light image. According to the present exemplary embodiment, contour points of the hand area are extracted, and an angle between vectors defined by the adjacent contour points is calculated with regard to the respective contour points. Then, the contour points where the angle between the vectors becomes lower than a threshold are extracted as candidate points of a leading edge position of the finger, and furthermore, a part where a plurality of candidate points of the leading edge position are closely spaced is identified as the indicating region. Moreover, an area surrounded by the contour points in the vicinity of the indicating region in the hand area is identified as the first area, and the center of gravity thereof is identified as the fingertip position. As a result, the fingertip position is identified in the vicinity of a finger pulp where the finger is in contact with the object instead of being on the outline of the hand area. The thus obtained fingertip position is identified as the touch position when the fingertip and the target surface 101 are in a touched state. It should be noted that, when the predetermined object is the hand of the operator, the indicating region is equivalent to the fingertip and will be accordingly referred as a "fingertip" below. When the predetermined object is a tool such as a stylus, a leading edge position of the tool is equivalent to the indicating region, and this can be similarly treated as the fingertip.

Figure 6A:
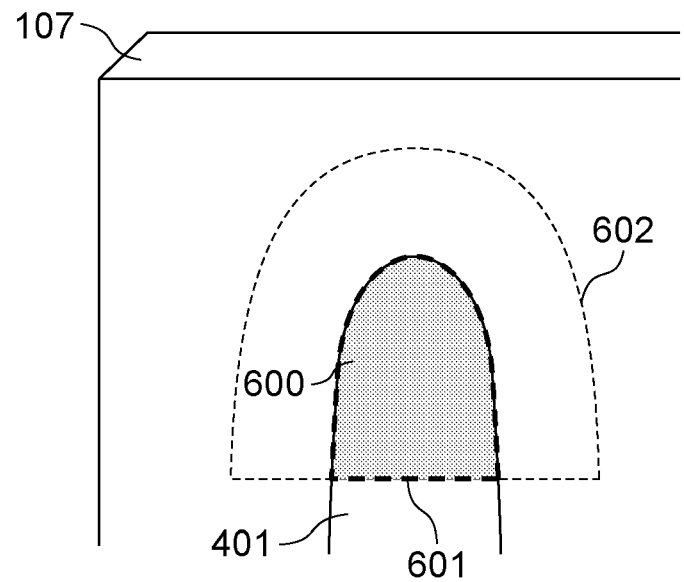
FIG. 6A illustrates an example of a window area in a case where a fingertip area and an inner part are occupied by an object according to the first exemplary embodiment.
Figure 6B:
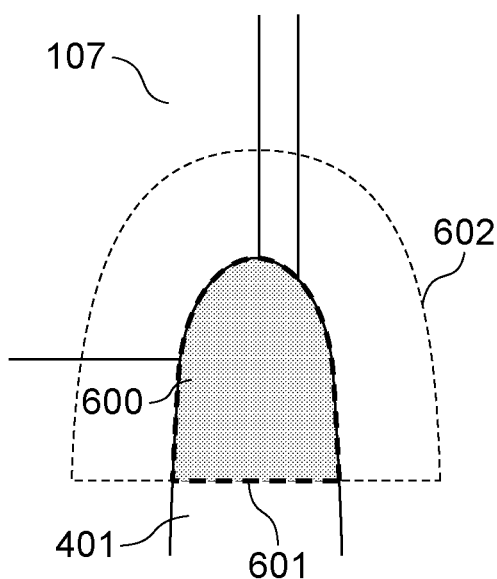
FIG. 6B illustrates an example of the window area in a case where the fingertip area and the inner part are not uniform according to the first exemplary embodiment.

In step S501, the second area setting unit 213 sets the second area in the vicinity of the first area detected in step S500. FIGS. 6A and 6B illustrate a relationship between the first area and the second area. Same reference symbols are assigned to the same elements as those of FIG. 1 and FIG. 4. In addition, up and down directions in the drawings are matched with those in the respective images illustrated in FIG. 4. FIG. 6A illustrates a case where the part equivalent to the leading edge of the index finger in the hand area 401 exists in the vicinity of the observer's upper left corner of the object 107. This corresponds to an environment where the image 400b of FIG. 4 is captured. According to the present exemplary embodiment, pixels on a side nearer to the leading edge than a base 601 of the first area in a pixel groups located within a predetermined distance from a point group constituting an outline of a first area 600 are set as a second area 602. By setting the second area in accordance with a shape of the first area, an advantage is attained that a deviation of a distance between the surface shielded by the fingertip and an image sensing surface in the second area is suppressed. It should be noted however that the setting method for the second area is not limited to this, and the calculation can be simplified by setting the second area as the rectangular or circular area in the vicinity of the first area. As illustrated in FIG. 6A, in a case where an inner part of the second area 602 is occupied by the object 107, the distances mapped onto the inner part of the second area are uniform.

On the other hand, FIG. 6B illustrates a case where the part equivalent to the leading edge of the index finger in the hand area 401 is overlapped with the observer's lower right corner of the object 107, and this corresponds to an environment where the image 400e of FIG. 4 is captured. At this time, the fingertip of the operator is in contact with the object 107. In FIG. 6B, the inner part of the second area 602 includes a border between the object 107 and the target surface 101, but a part of the border is shielded by the finger of the operator. In the above-described case, a plurality of surfaces where the mapped distances are discontinuous are generated in the inner part of the second area depending on a height of the object 107. In the downstream processing, the distance obtained from the second area is compared with the distance of the fingertip, so that it is determined whether or not the fingertip is in contact with the target surface. However, in a case where the distances in the second area are not uniform as in the situation of FIG. 6B, the distance comparison between the second area and the fingertip needs to be devised.

Figure 7:
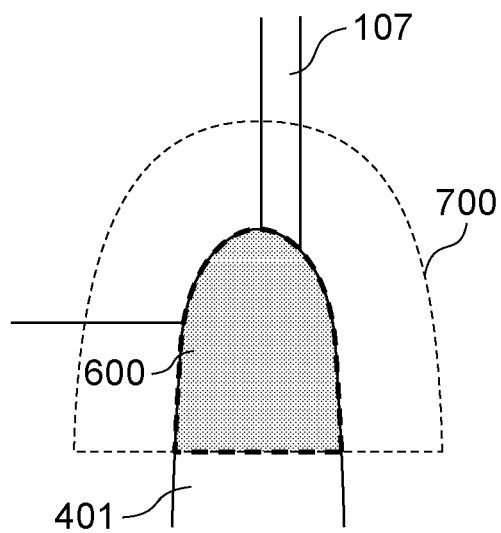
FIG. 7 illustrates an example of division of the window area according to the first exemplary embodiment.
Figure 7:
Figure 7:
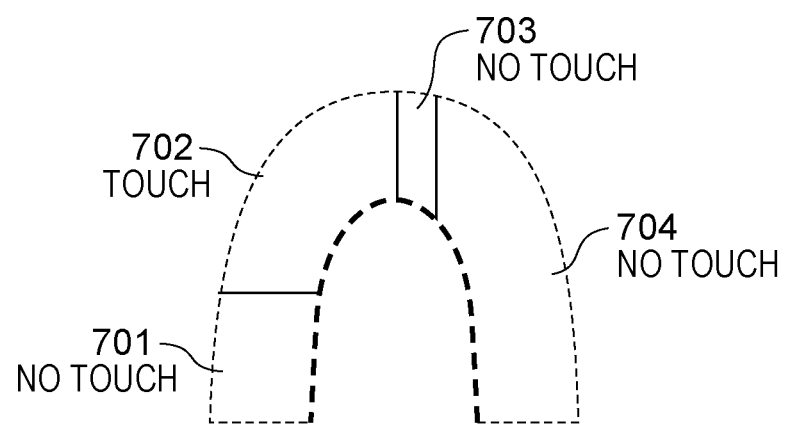

In view of the above, in step S502, the dividing unit 215 divides the inner part of the second area into a plurality of small areas on the basis of distance discontinuity. According to the present exemplary embodiment, a gradient between the pixels is obtained by differential calculation with respect to the distance values mapped onto the respective pixels (respective coordinates) in the second area, and the pixels where the gradient is locally increased are detected as the discontinuous part. Herein, FIG. 7 illustrates a division example of the second area. A lower part of FIG. 7 illustrates an example in which the second area is divided in the situation of FIG. 6B. An upper part of FIG. 7 illustrates the same situation as that of FIG. 6B for comparison. In the division example illustrated in FIG. 7, the second area 700 is divided into small areas 701 to 704 on the basis of the border where the distances become discontinuous. According to the present exemplary embodiment, while the distances of the respective divided small areas from the reference and the distance of the fingertip from the reference are compared with each other at this time, the presence or absence of the touch input is effectively recognized even in a case where the discontinuous surfaces exist in the second area.

In step S503, the recognition unit 216 sets a contact flag provided in the RAM 202 as FALSE. The contact flag is set as TRUE when it is determined that one or more small areas and the fingertip are in contact with each other. Next, subsequent steps S504 to S507 are sequentially processed with regard to the respective small areas.

In step S504, the recognition unit 216 selects one small area that is not processed from among the plurality of small areas generated by the division. Then, the distance obtaining unit 214 obtains a distance to the fingertip and a distance to the selected small area while the imaging unit is set as a reference on the basis of distances mapped onto the visual light image. According to the present exemplary embodiment, an average value of distances mapped onto pixels included in the first area is obtained as a distance from the imaging unit to the fingertip. In addition, an average value of distances of the pixels included in the selected small area is obtained as the distance from the imaging unit to the small area (distance to the surface reflected in the small area). The recognition unit 216 compares the obtained distances with each other. According to the first exemplary embodiment, a value (difference) obtained by subtracting the distance from the imaging unit to the fingertip from the distance from the imaging unit to the small area is regarded as a distance between the fingertip and the small area. In step S505, the recognition unit 216 determines whether or not this distance between the fingertip and the small area is lower than a predetermined threshold. In a case where the distance difference is lower than the predetermined threshold, it is determined that the fingertip and the small area are in contact with each other. It should be noted that the threshold is preferably determined while taking into account the focusing accuracy of the range image sensor or the thickness of the finger. When it is determined that the fingertip and the small area are not in contact with each other (step S505: NO), the recognition with respect to the small area is ended, and the flow proceeds to step S508. On the other hand, when it is determined that the fingertip and the small area are in contact with each other (step S505: YES), the flow proceeds to step S506.

It should be noted however that the calculation can also be simplified by using the distance of the pixel equivalent to the center of gravity of the first area as a substitution for the distance from the imaging unit to the fingertip. In addition, the distance of the pixel equivalent to the center of gravity of the small area can be used as a substitution for the distance from the imaging unit to the small area. In addition, not only the distance between the fingertip and the small area but also, for example, a change amount or a change direction thereof can also be used to improve the determination accuracy for the contact determination.

In step S506, the recognition unit 216 changes the contact flag stored in the RAM 202 to TRUE. Furthermore, in step S507, the contact point obtaining unit 217 obtains a set of points in contact with the selected small area in the image among the contour points of the first area to be stored in the RAM 202. The obtained set of the contour points is equivalent to the border between the fingertip part in the hand area and the small area. In addition, the set of contact points stored herein is used for the touch position detection in a downstream stage. In step S508, the recognition unit 216 determines whether or not the above-described processing in step S504 to step S507 is performed with respect to all the small areas after the division. In a case where the processing with respect to all the small areas is not performed (step S508: NO), the flow returns to step S504, and the processing with respect to the unprocessed small area is started. In a case where the processing with respect to all the small areas is performed (step S508: YES), the flow proceeds to step S509.

In step S509, the recognition unit 216 checks a state of the contact flag stored in the RAM 202. In a case where at least one small area in which the distance to the fingertip is lower than the threshold exists, the contact flag is set as TRUE (step S509: YES). At this time, the recognition unit 216 determines that the fingertip contacts the target surface, and the flow proceeds to the detection processing for the touch position in step S510 and subsequent steps. For example, in the example of FIG. 7 (corresponding to 400e in FIG. 4), the distance between the small area 702 among the small areas 701 to 704 and the first area 600 is below the threshold, and the contact flag is set as TRUE. As a result, it is determined that the fingertip is in contact with the target surface. On the other hand, in a case where the small area in which the distance to the fingertip is lower than the threshold does not exist, the contact flag is set as FALSE (step S509: NO). At this time, the recognition unit 216 determines that the fingertip is not in contact with the target surface, and the processing with respect to the input image is ended.

Next, the detection method for the touch position will be described. As illustrated in FIG. 6A, in a case where the touch is performed in an inner side far from the end part of the object 107, when the center of gravity of the first area is detected as the touch position, it is possible to obtain the position in the vicinity of the pulp of the finger where the probability that the object in the fingertip is actually contacted is high. However, as illustrated in FIG. 6B, in a case where the touch is performed in the vicinity of the end part of the object 107, the center of gravity of the first area may be obtained on an outer side with respect to the end part of the object 107 in some cases. In the above-described case, it is unnatural to regard the center of gravity of the first area as the position where the finger contacts the object 107. Furthermore, this may become a cause for executing an operation unintended by the operator in the processing in the downstream stage. In view of the above, according to the present exemplary embodiment, the position still closer to the actual contact position is detected as the touch position on the basis of the set of the contact points between the small area and the first area instead of simply setting the center of gravity of the first area as the touch position.

Figure 8A:
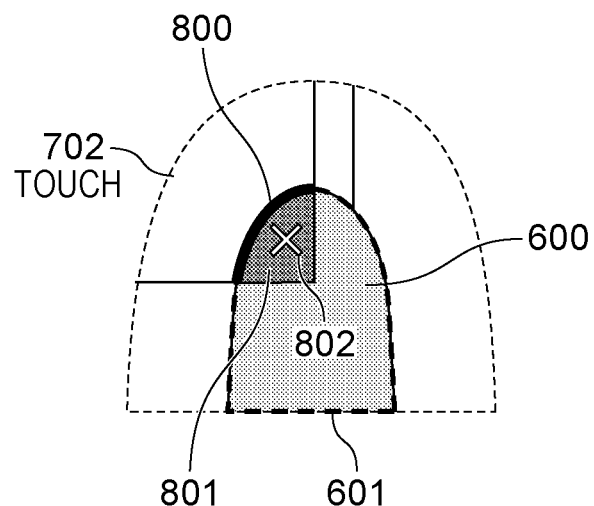
FIG. 8A illustrates examples of fingertip area cutout and fingertip position detection according to the first exemplary embodiment.

First, in step S510, the position determination unit 218 cuts out an area estimated to be actually in contact with the target surface in the first area (hereinafter, will be referred to as a contact area) on the basis of the set of contact points stored in the RAM 202. FIG. 8A illustrates examples of the cutout of the contact area and the result of the fingertip position determination. In step S505, when it is determined that the small area 702 is in contact with the first area 600, the RAM 202 stores a contact point set 800. In view of the above, according to the present exemplary embodiment, an area including the contact point set 800 is cut out from the first area 600 by an intersect perpendicular to an intersect in parallel with the base 601 of the first area to be obtained as a contact area 801. Furthermore, in step S511, the position determination unit 218 obtains a center of gravity 802 of the contact area 801 to be output as the touch position. As a result, it is possible to obtain the position still closer to the position where the finger actually contacts the object as compared with a case where the center of gravity of the first area is detected as the touch position.

Figure 8B:
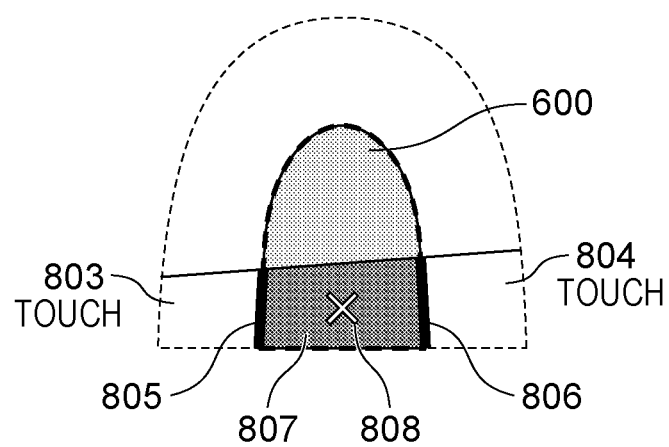
FIG. 8B illustrates examples of the fingertip area cutout and the fingertip position detection in a case where a plurality of small areas determined to have the contact exist according to the first exemplary embodiment.

It should be noted that the cutout method for the contact area in step S510 is not limited to the above-described method. In particular, as illustrated in FIG. 8B, in a case where a plurality of small areas (small areas 803 and 804) determined to have the contact exist, the contact point set may be divided in some cases (contact point sets 805 and 806). In the above-described case, an area 807 that connects mutual end parts of the contact point sets to be surrounded is cut out, and a center of gravity of the area 807 is detected as the touch position, so that it is possible to obtain the position still closer to the contact position.

As described above, according to the present exemplary embodiment, the touch input between the fingertip and the target surface is recognized on the basis of the comparison between the distance from the reference to the fingertip and the distance from the reference to the area (part where the distance measurement can be performed) in the vicinity of the fingertip in the target surface for the input. As a result, even in an environment where the imaging system of the target surface for the touch input may move and a part of the target surface is shielded by the finger, the touch input with respect to the target surface by the fingertip can be recognized. Furthermore, even in a case where the touch input is performed with respect to the end part of the object, the touch input and the detection of the touch position can be highly accurately performed.

Figure 9:
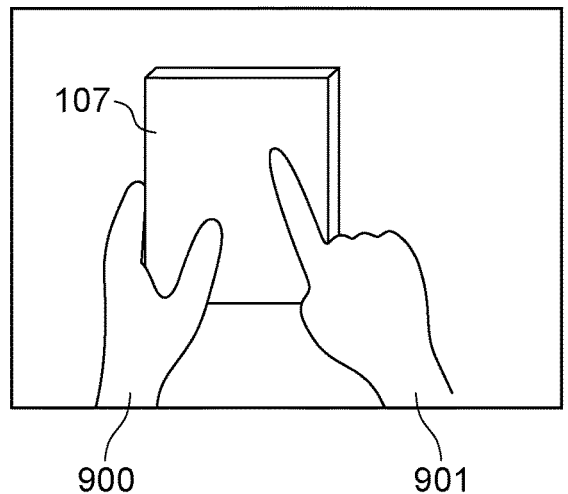
FIG. 9 illustrates an example of the visual light image in which a situation where a touch input is performed with respect to a moving object is imaged according to the first exemplary embodiment.

It should be noted that the case where the touch input is performed while the surface of the object placed on the table is set as the target surface has been described in the above-described use example. It should be noted however that the target surface for the touch input is not limited to the placed object. Herein, FIG. 9 illustrates an example of the visual light image in which a situation where the touch input is performed with respect to the moving object 107 is captured according to the first exemplary embodiment. For example, as illustrated in FIG. 9, the present exemplary embodiment can also be applied to a case where, while the surface of the object 107 gripped and moved by a hand 900 of the operator is set as the target surface, the operator performs the touch operation by another hand 901. In addition, for example, the present exemplary embodiment can also be applied to a manner of use in which the touch input is recognized in a case where the object 107 is brought close to the static hand 901. It should be noted that, in a case where not only the hand 901 in operation but also the hand 900 gripping the object 107 are imaged, it is possible to suppress erroneous recognition of the touch input by adding processing of determining whether or not the extracted hand area is the hand in operation by way of discrimination based on an outline shape of the hand area or the like. That is, it is possible to avoid the erroneous recognition of the contact to the object 107 for the purpose of the gripping by the hand 900 as the touch operation.

In addition, in the above-described example, the case has been described where the touch input is recognized on the basis of the visual light image or the range image obtained from the imaging units fixed so as to look down at the target surface from the space above the table. It should be noted however that the installment positions of the imaging units are not limited to these positions. For example, even in the case of the imaging unit to which the HMD is mounted in which the distance relationship with the touch target surface frequently varies in accordance with the position or orientation of the face of the operator, the accuracy for the recognition of the touch input and the recognition of the touch operation can be improved while the present exemplary embodiment is applied.

Next, according to a modified example of the first exemplary embodiment, an example will be described in which a touch recognition based on a previously measured distance of the touch target surface and the touch recognition described according to the first exemplary embodiment are used in combination. According to the above-described first exemplary embodiment, while the possibility that the distance from the reference to the target surface for the touch input may vary in the part shielded by the fingertip where the measurement is not be performed is taken into account, the touch input is recognized on the basis of the distance from the reference to the part in the target surface where the distance measurement can be performed at that time point in any cases. In contrast to this, according to the present modified example, in a case where it is estimated that the distance of the target surface shielded by the fingertip does not vary, the touch is recognized on the basis of the previously measured distance to the shielded area that is shielded by the fingertip of the touch target surface. On the other hand, in a case where it is estimated that the distance of the target surface shielded by the fingertip varies, the touch is recognized on the basis of the distance obtained from the second area described according to the first exemplary embodiment. That is, the touch input is recognized by different processings in accordance with the results of the determination on whether or not it is estimated that the distance from the reference to the target surface for the touch input varies. That is, this determination processing is equivalent to the determination on whether or not the information of the previously measured distance is credible enough.

As a result of the above-described determination, in a case where it is estimated that the distance of the shielded target surface does not vary, the previously measured distance from the reference to the shielded area and the distance from the reference to the fingertip at that time point are used to recognize the touch input. An advantage of the use of the previously measured distance is, for example, that the touch recognition to the target that does not appear in the second area such as a protrusion or the like smaller than the range shielded by the fingertip can be performed. In addition, since the second area is a small area with respect to the entire image, influences from coarseness of the resolution of the range image, shadow of the finger appearing on the visual light image, and the like are affected in some cases. In contrast, the distance can be measured while those influences are not affected from the image at a time point when the shielding object does not exist, so that stable results are likely to be obtained. Then, according to the present modified example, even in a case where the distance varies in the part where the target surface is shielded and the previously measured distance of the target surface is not used, the recognition of the touch input is performed by using the distance that can be measured in the vicinity of the finger as described according to the first exemplary embodiment. As a result, the erroneous recognition is suppressed, and the accuracy of the overall touch recognition function can be improved.

Hereinafter, similarly as in the first exemplary embodiment, a case will be described as an example where the operator places the object on the target surface of the table top interface system, and an arbitrary area on the surface of the object is specified by the operation from the touch to the move and then to the release by a single finger of one hand of the operator to image the area. It should be noted however that the predetermined object is not limited to the hand of the operator or the finger according to the modified example too.

Configuration of the Apparatus

The external view of the interface system and the configuration of the apparatus according to the modified example are pursuant to those according to the first exemplary embodiment illustrated in FIG. 1 and FIGS. 2A and 2B. Therefore, detailed descriptions with regard to the common respective elements will be omitted.

Figure 10:
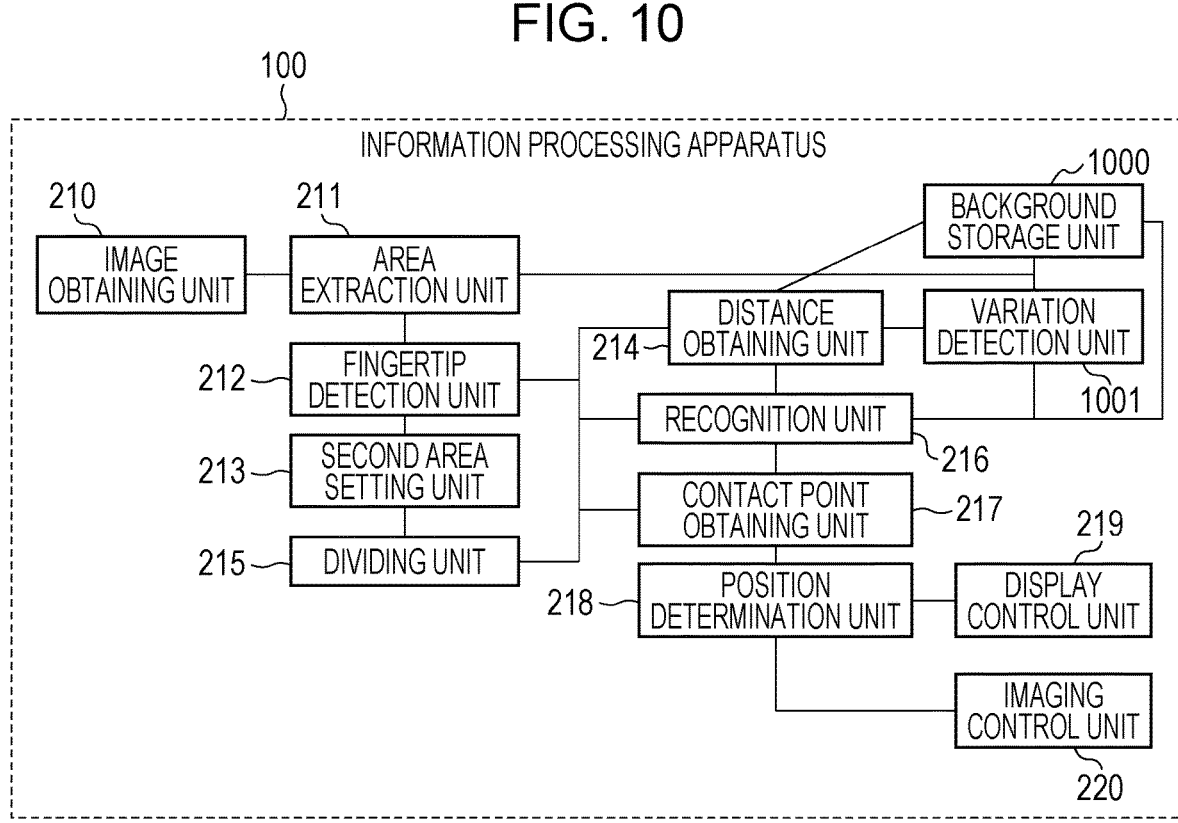
FIG. 10 is a block diagram illustrating an example of the function configuration according to a modified example.

FIG. 10 is a block diagram illustrating an example of the function configuration of the information processing apparatus 100 according to the modified example. The respective function units are realized while the CPU 200 expands the program stored in the ROM 201 into the RAM 202 and executes the processings in accordance with the respective flow charts according to the first exemplary embodiment. It should be noted however that hardware can also be used as a substitution. In addition, the same reference symbols are assigned to the function units having the equivalent functions to those of the first exemplary embodiment illustrated in FIG. 2B, and detailed descriptions thereof will be omitted. Here, aspects different from the first exemplary embodiment will be described.

A background storage unit 1000 stores distances equivalent to the respective pixels in the RAM 202 as the background range image with regard to all the pixels except for the hand area extracted by the area extraction unit 211 in the image obtained by the image obtaining unit 210. In a case where the background range image is already stored, the information is updated.

A variation detection unit 1001 detects whether or not the state of the target surface is varied with regard to predetermined pixels except for the pixels in the hand area extracted by the area extraction unit 211 in the input image obtained in the image obtaining unit 210. According to the present exemplary embodiment, the variation is detected on the basis of a difference (difference between frames) between the input image obtained at the time of this processing and the input image obtained at the time of the previous processing.

The recognition unit 216 according to the modified example recognizes the presence or absence of the contact between the fingertip detected by the fingertip detection unit 212 and the small areas divided by the dividing unit 215 in the vicinity of the fingertip in a case where the variation is detected by the variation detection unit 1001. On the other hand, in a case where the variation is not detected by the variation detection unit 1001, the recognition unit 216 recognizes the presence or absence of the contact between the fingertip detected by the fingertip detection unit 212 and the area equivalent to the fingertip in the background range image stored in the background storage unit 1000.

Recognition Processing of the Area Specification Operation

Figure 11:
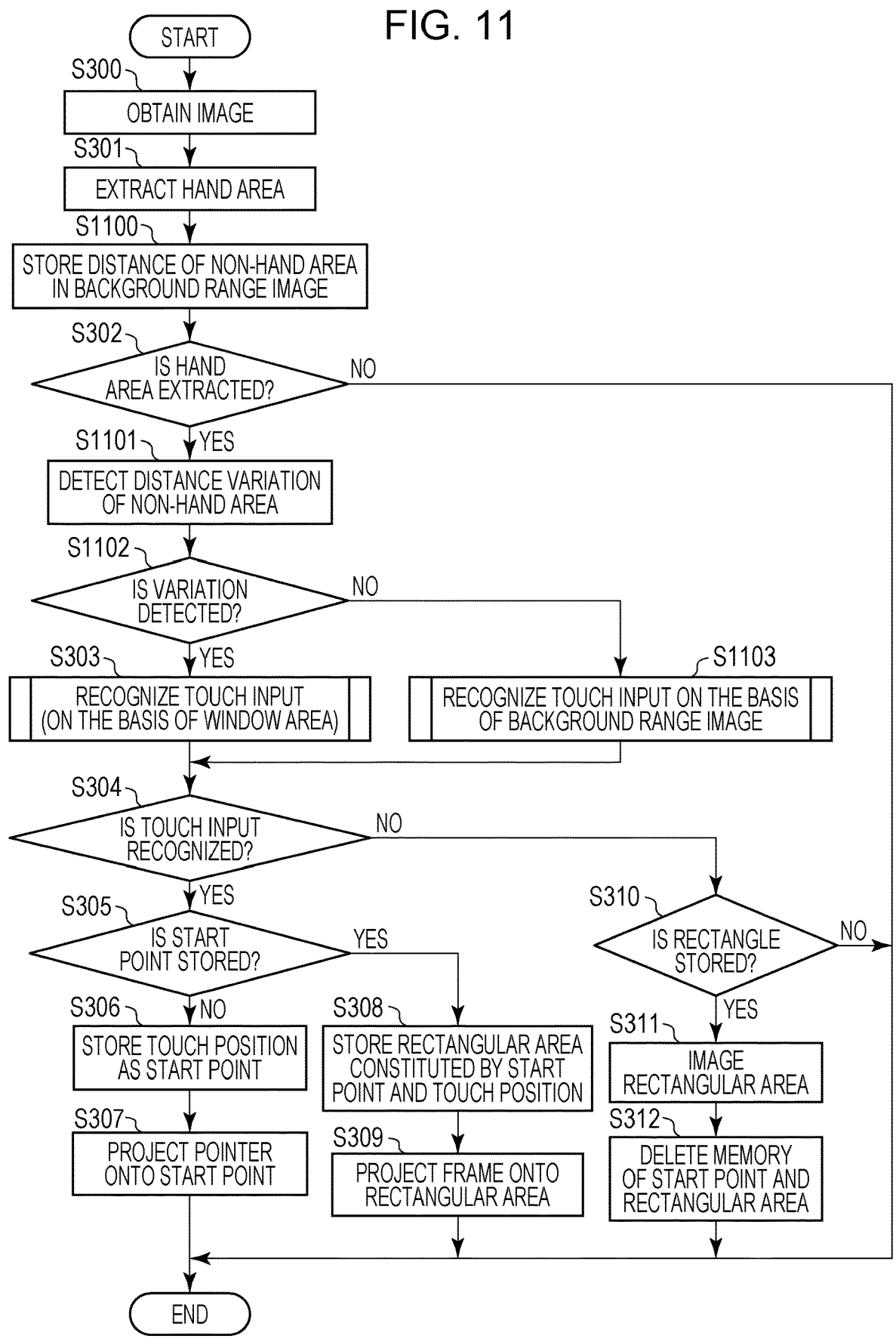
FIG. 11 is a flow chart illustrating an example of the flow of the recognition processing of the area specification operation according to the modified example.

The imaging processing for the specified area bases on the touch input according to the modified example will be described in accordance with the flow chart of FIG. 11. The processing in the flow chart of FIG. 11 is realized while the CPU 200 constituting the respective function units of the information processing apparatus expands the program stored in the ROM 201 into the RAM 202 to be executed. According to the present exemplary embodiment, the processing in the flow chart of FIG. 11 is started in response to the input of the visual light image captured by the visible light camera 102 to the information processing apparatus 100. In addition, according to the present exemplary embodiment, the processing in the flow chart of FIG. 11 is repeatedly performed each time the visual light image is input from the visible light camera 102. Therefore, a cycle in which the processing is repeatedly performed is matched with a frame rate of the captured video of the visible light camera 102. It should be noted that the same reference numbers are assigned to the steps in which the processing equivalent to that of the first exemplary embodiment illustrated in FIG. 3 is performed, and detailed descriptions thereof are omitted. Here, aspects different from the first exemplary embodiment will be described.

In step S1100, the background storage unit 1000 stores the distances mapped onto the pixels except for the hand area extracted in step S301 in the RAM 202 as the distances in the respective pixels of the background range image. The background range image refers to information of an image format where a value equivalent to the distance from the range image sensor 103 set as the reference to the point on the touch target surface corresponding to the pixel is stored in each of the pixels constituting the image. In step S1100, in a case where the background range image is already stored, the distances are stored or updated only with respect to the pixels except for the hand area in the background range image, and the distances equivalent to the pixels equivalent to the hand area are not updated. That is, the background range image refers to data that has the same number of pixels as the range image captured by the range image sensor 103 for the correspondence on a one-to-one basis, and a value is appropriately updated for each pixel instead of a single image itself captured by the range image sensor 103 at a certain time. According to the present modified example, each time the range image is repeatedly captured, in step S1100, the distance of the part corresponding to a non-hand area is reflected on the background range image. As a result, even if the part is shielded afterwards by the finger or the like, the distance information of the touch target surface existing below the finger or the like can be held during a period in which the target surface and the range image sensor 103 are not varied.

According to the modified example, when it is determined in step S302 that the hand area is extracted (step S302: YES), the flow proceeds to step S1101. In step S1101, the variation detection unit 1001 detects whether or not the state of the target surface is varied with regard to the area except for the hand area extracted by the area extraction unit 211 in the image obtained by the image obtaining unit 210. According to the present modified example, the variation is detected on the basis of the difference (difference between the frames) between the image obtained in the last time in step S300 and the image obtained in the previous time. It should be noted that the determination result may be obtained only on the basis of the inter-frame difference processing between the range images, or the determination may be performed in both the range image and the visual light image, and one result or both of the results may also be output as the determination result. In a case where the variation is detected (step S1102: YES), the flow proceeds to step S303. A case where the flow proceeds to step S303 is a case where it is assumed that the probability that the distance of the area shielded by the hand area of the stored background range image is varied is high. In step S303, similarly as in the first exemplary embodiment, the recognition processing of the touch input based on the detection of the second area is executed. On the other hand, in a case where the variation is not detected (step S1102: NO), the flow proceeds to step S1103. A case where the flow proceeds to step S1103 is a case where it is assumed that the probability that the distance of the area shielded by the hand area of the stored background range image is not varied. In step S1103, the fingertip detection unit 212 and the recognition unit 216 process the touch recognition based on the background range image. The subsequent operation recognition processing is similar to the first exemplary embodiment. It should be noted that, in step S1102, the area where the variation is detected is limited to the area at a predetermined distance from the hand area in the non-hand area, so that it is possible to increase the detection accuracy for the presence or absence of the variation of the area shielded by the hand area.

Recognition Processing of the Touch Input

Figure 12:
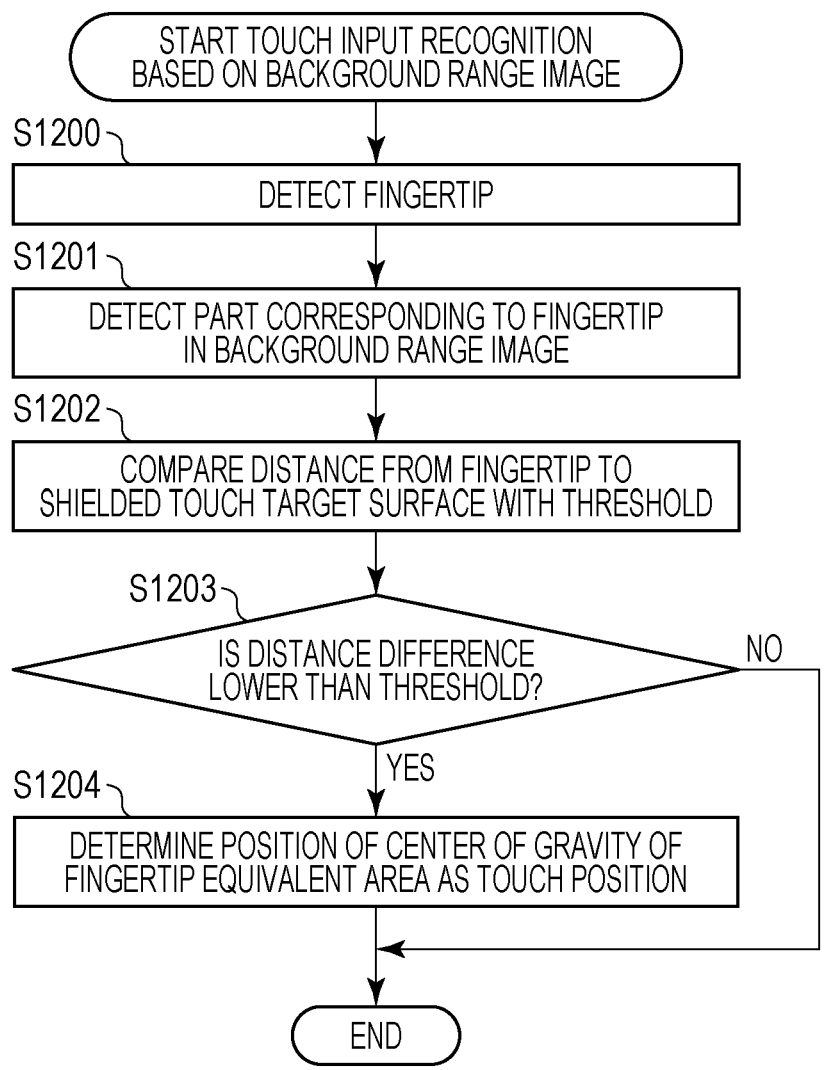
FIG. 12 is a flow chart illustrating an example of the flow of the touch recognition processing based on a background range image according to the modified example.

Here, the recognition processing of the touch input based on the background range image in step S1103 will be described. FIG. 12 is a flow chart illustrating the recognition processing of the touch input based on the background range image according to the modified example. The processing in the flow chart of FIG. 12 is started in accordance with the detection of the variation in the image in step S1102.

First, in step S1200, the fingertip detection unit 212 detects the first area equivalent to the fingertip from the hand area extracted in the visual light image. According to the present exemplary embodiment, the fingertip is detected by the similar method to step S500 described above. In step S1201, the background storage unit 1000 detects a partial area corresponding to the first area from the background range image stored in the RAM 202 on the basis of the information representing the position (coordinate) of the first area detected in step S1200.

In step S1202, the recognition unit 216 obtains a difference between the distance from the reference to the fingertip obtained from the first area detected in step S1200 and the distance from the reference to the target surface obtained from the partial area in the background range image detected in step S1201. Then, a magnitude of the difference is compared with the predetermined threshold. A part in the background range image detected in step S1201 represents the touch target surface shielded by the fingertip. According to the modified example, an average value of the distances mapped onto the pixels included in the first area is obtained as the distance from the reference to the fingertip. In addition, an average value of the distances of the pixels occupying the part corresponding to the first area in the background range image is obtained as a distance from the reference to the target surface shielded by the fingertip. Then, a value (difference) obtained by subtracting the distance from the reference to the fingertip from the distance from the reference to the touch target surface is regarded as the distance between the fingertip and the target surface. In a case where this difference is lower than the predetermined threshold, it is determined that the fingertip is in contact with the touch target surface shielded by the fingertip. It should be noted that the threshold is preferably determined while the focusing accuracy of the range image sensor or the thickness of the finger is taken into account.

In a case where the distance between the fingertip and the area equivalent to the fingertip is higher than the threshold and it is not determined that the contact occurs (step S1203: NO), the touch recognition processing with respect to the input image is ended. On the other hand, in a case where the fingertip and the area equivalent to the fingertip is lower than the threshold and it is determined that the contact occurs (step S1203: YES), the flow proceeds to step S1204, and the position determination unit 218 obtains the center of gravity of the area equivalent to the fingertip to be output as the touch position.

In the above-described manner, according to the present modified example, it is possible to highly accurately recognize the touch operation with respect to the touch target surface that does not vary, and furthermore, the touch operation with respect to the touch target surface that varied in the shielded state can be recognized.

Figure 13A:
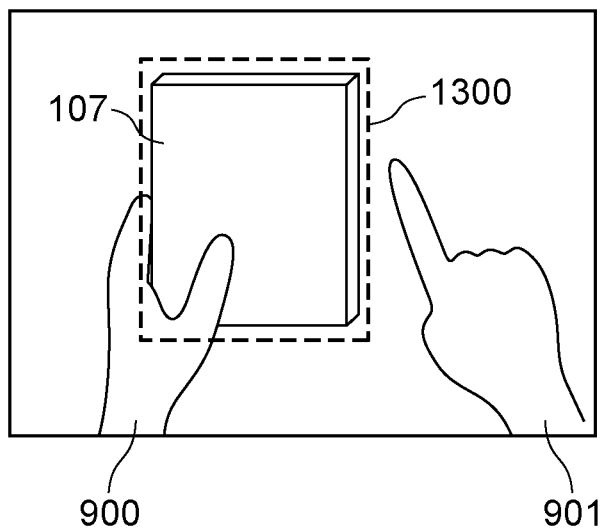
FIGS. 13A and 13B illustrate an example of the visual light image in which a situation where the touch input is performed with respect to a gripped object and a non-gripped object is imaged according to the modified example.
Figure 13B:
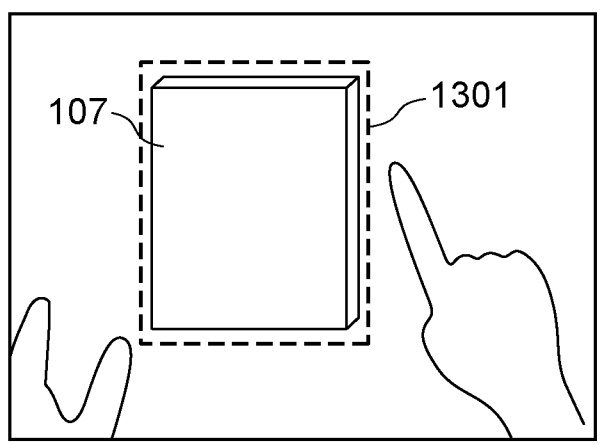

It should be noted that, according to the above-described modified example, the variation of the touch target surface is detected on the basis of the difference between the frames of the input image, and the recognition processing of the touch input is switched on the basis of the presence or absence of the variation. It should be noted however that, instead of this configuration, the resting state and/or the non-resting state of the object may be detected on the basis of the determination on whether or not the object is gripped, and the detection result may be regarded as the presence or absence of the variation to be set as the reference for the switching of the recognition processing. FIGS. 13A and 13B illustrate examples of the visual light image in which a state of the touch input performed with respect to each of the gripped object and the object that is not gripped is captured. In FIG. 13A, the object 107 is gripped by the hand 900 of the operator, and the probability that the touch target surface on the object 107 varies is high. In view of the above, in a case where the hand area or the first area is overlapped with an area 1300 equivalent to the gripped object, the determination result in step S1102 is set as YES, and the touch input is recognized on the basis of the second area. On the other hand, in FIG. 13B, the object 107 is released from the hand 900 of the operator to be placed, and the probability that the touch target surface on the object 107 varies is very low. In view of the above, in a case where the hand area or the first area is overlapped with an area 1301 equivalent to the placed object, the determination result in step S1102 is set as NO, and the touch input is recognized on the basis of the background range image. The determination on whether or not the object is gripped can be performed by detecting whether or not the object area is away from the hand area and the frame of the image to be isolated in the images at the predetermined number of frames obtained in past times. As a result, it is possible to increase the detection accuracy for the presence or absence of the variation of the area shielded by the hand area.

According to the exemplary embodiment, the recognition accuracy for the input can be improved in the system where the state in which the distance between the predetermined object and the target surface becomes lower than the predetermined distance is recognized as the input to the target surface by the predetermined object.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-091625 filed Apr. 28, 2016, which is hereby incorporated by reference herein in its entirety.

What is claimed is:

1. An information processing apparatus, comprising:
one or more memories for storing instructions; and
one or more processors capable of executing the instructions causing the information processing apparatus to:
obtain an image input from an imaging unit of which depth direction intersects with a target surface in each of the obtained images;
obtain, with regard to a plurality of areas constituting the image, information equivalent to distances from a reference position of the imaging unit to surfaces to be imaged in the respective areas;
set, in one image of the obtained images, a first area where a predetermined region of a first object is imaged and a second area that is located in vicinity of the first area; and
recognize an input state by the first object to a part, shielded by the first object in the one image, of surface of a second object placed on the target surface based on a comparison between the information obtained with regard to the first area set in the one image and the information obtained with regard to the second area set in the one image.

2. The information processing apparatus according to claim 1, wherein, based on determining that a distance between the predetermined region of the first object and the target surface is lower than a predetermined distance by using the information obtained with regard to the first area and the information obtained with regard to the second area, the one or more processors causes the information processing apparatus to recognize a predetermined input state to the target surface by the first object.

3. The information processing apparatus according to claim 2, wherein the predetermined input state includes a state in which it is regarded that the first object touches the target surface.

4. The information processing apparatus according to claim 1,
wherein the one or more processors causes the information processing apparatus to obtain information equivalent to distances from the imaging unit to the surfaces to be imaged of the respective pixels of the image, and
wherein the recognizing uses: a) the information obtained with regard to a pixel group in the first area where the predetermined region of the first object is imaged in the one of the images obtained and b) the information obtained with regard to the second area that is the part of the image and in contact with the surrounding of the first area and recognizes the input stage.

5. The information processing apparatus according to claim 1,
the setting includes setting a part except for the first area in a set of pixels at a predetermined distance from an outline of the predetermined region of the first object in the one of the images as the second area.

6. The information processing apparatus according to claim 1,
wherein the one or more processors causes the information processing apparatus to extract, on a basis of a shape of an outline of the predetermined region of the first object captured on the one of the images, the first area from the image, and
wherein the setting includes setting the second area on a basis of a shape of the first area extracted.

7. The information processing apparatus according to claim 1, wherein, in response to a difference between a distance estimated on a basis of the information obtained with regard to the first area from a position corresponding to the reference position to the predetermined region of the first object and a distance estimated on a basis of the information obtained with regard to the second area from the position corresponding to the reference position to a part shielded by the predetermined region of the first object in the target surface being lower than a predetermined distance, the recognizing includes recognizing a predetermined input state to the target surface by the first object.

8. The information processing apparatus according to claim 1, wherein the information obtained with regard to the second area is equivalent to a distance from a position corresponding to the reference position to a part shielded by the predetermined region of the first object in the target surface.

9. The information processing apparatus according to claim 1,
wherein the one or more processors causes the information processing apparatus to divide the second area into one or more small areas on a basis of a predetermined condition,
wherein the obtaining comprises obtaining, for each divided small area, information equivalent to a distance from a position corresponding to the reference position to an imaging surface of the small area, and
wherein, based on determining that a difference between a distance from the position corresponding to the reference to the predetermined region of the first object and one of distances obtained for the respective small areas is lower than a predetermined distance by using the information obtained, the recognizing includes recognizing a predetermined input state to the target surface by the first object.

10. The information processing apparatus according to claim 9, wherein the dividing includes dividing the second area into one or more small areas on a basis of distance discontinuity.

11. The information processing apparatus according to claim 9,
wherein the one or more processors causes the information processing apparatus to obtain a set of contact points between the first area and the small area where a difference between a distance from the position corresponding to the reference position to the surface to be imaged of the small area among the one or more small areas and a distance from the position corresponding to the reference position to the predetermined region of the first object is lower than the predetermined distance, and
wherein the one or more processors causes the information processing apparatus to extract, in response to recognizing the predetermined input state, the small area including the set of contact points from the first area and detect a position indicated by the predetermined region on a basis of a center of gravity of the extracted area.

12. The information processing apparatus according to claim 1, further comprising:
a storage for a background range image which is configured to store information of a distance of an area obtained by excluding at least an area where the first object is captured from the image obtained as information of a distance of the background range image, wherein the one or more processors causes the information processing apparatus to detect a presence or absence of a variation of a distance from a position corresponding to the reference position to the surface to be imaged equivalent to the area obtained by excluding the area where the object is captured on a basis of a distance reflecting on the image obtained, and wherein the recognizing includes recognizing, in response to not detecting the variation, the input state to the target surface by the object by using the information obtained with regard to the first area and the information obtained with regard to the second area.

13. The information processing apparatus according to claim 12, wherein the detecting does not include setting an area that is not overlapped with at least the first area in the image as a target for detecting the variation.

14. The information processing apparatus according to claim 12, wherein the recognizing includes recognizing, in response to detecting the variation, the input state to the target surface by the object by using the information obtained with regard to the first area and the information obtained with regard to the background range image stored in the storage.

15. An information processing apparatus comprising:
one or more memories for storing instructions; and
one or more processors capable of executing the instructions causing the information processing apparatus to:
obtain an image input from an imaging unit;
obtain, with regard to a plurality of areas constituting the image, information equivalent to distances from a reference position of the imaging unit to surfaces to be imaged in the respective areas;
set, in one image of the obtained images, a first area where a predetermined region of an object is imaged and a second area that is located in vicinity of the first area;
recognize an input state to a target surface by the object based on a comparison between the information obtained with regard to the first area set in the one image and the information obtained with regard to the second area set in the one image; and
determine, in response to recognizing the predetermined input state to the target surface by the object, wherein a center of gravity of the first area is determined as a position regarded to be indicated by the input.

16. A control method for an information processing apparatus configured to recognize a state in which a distance between a predetermined region in an operating member and a target surface is lower than a predetermined distance as an input to the target surface by the operating member, the control method comprising:
obtaining an image input from an imaging unit of which depth direction intersects with a target surface in each of the obtained images;
setting, in one image of the obtained images, a first area where a predetermined region of an object is imaged and a second area that is located in vicinity of the first area; and
recognizing an input state by the first object to a part, shielded by the first object in the one image, of surface of a second object placed on the target surface by the object based on a comparison between the information obtained with regard to the first area set in the one image and the information obtained with regard to the second area set in the one image.

17. A non-transitory computer-readable storage medium storing a program for executing a control method for an information processing apparatus configured to recognize a state in which a distance between a predetermined region in an operating member and a target surface is lower than a predetermined distance as an input to the target surface by the operating member, the control method comprising:
obtaining an image input from an imaging unit;
setting, in one image of the obtained images, a first area where a predetermined region of an object is imaged and a second area that is located in vicinity of the first area; and
recognizing an input state by the first object to a part, shielded by the first object in the one image, of surface of a second object placed on the target surface by the object based on a comparison between the information obtained with regard to the first area set in the one image and the information obtained with regard to the second area set in the one image.

* * * * *